United States Patent
Kessler et al.

(10) Patent No.: US 9,038,593 B1
(45) Date of Patent: May 26, 2015

(54) LUBRICATING CONFIGURATION FOR MAINTAINING WRISTPIN OIL PRESSURE IN A TWO-STROKE CYCLE, OPPOSED-PISTON ENGINE

(71) Applicant: Achates Power, Inc., San Diego, CA (US)

(72) Inventors: John M. Kessler, Oceanside, CA (US); Clark A. Klyza, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 1 day.

(21) Appl. No.: 14/075,926

(22) Filed: Nov. 8, 2013

(51) Int. Cl.
*F02B 75/28* (2006.01)
*F01M 11/02* (2006.01)

(52) U.S. Cl.
CPC .......... *F02B 75/28* (2013.01); *F01M 2011/021* (2013.01)

(58) Field of Classification Search
CPC ..... F01M 2011/021; F16J 9/3278; F16J 1/08; F16J 1/16
USPC ........ 123/196 R, 193.6, 197.3, 61 R; 184/24, 184/27.1
See application file for complete search history.

(56) References Cited

U.S. PATENT DOCUMENTS

| | | | | |
|---|---|---|---|---|
| 764,886 | A * | 7/1904 | Donnenwerth | 92/110 |
| 1,088,510 | A * | 2/1914 | Adams | 184/18 |
| 1,404,797 | A * | 1/1922 | Severson | 184/18 |
| 1,959,279 | A * | 5/1934 | Stearns | 92/157 |
| 3,480,113 | A | 11/1969 | Pope et al. | 184/6 |
| 3,992,980 | A | 11/1976 | Ryan et al. | 92/157 |
| 4,466,387 | A | 8/1984 | Perry | 123/41.37 |
| 4,515,110 | A | 5/1985 | Perry | 123/451.37 |
| 4,785,790 | A * | 11/1988 | Pfeffer et al. | 123/78 B |
| 4,864,977 | A * | 9/1989 | Hasegawa | 123/48 B |
| 4,984,544 | A | 1/1991 | DeBiasse | 123/197 |
| 5,417,185 | A * | 5/1995 | Beattie | 123/48 B |
| 5,806,631 | A * | 9/1998 | Yoshida et al. | 184/18 |
| 5,839,351 | A * | 11/1998 | Nakada | 92/160 |
| 7,156,056 | B2 * | 1/2007 | Lemke et al. | 123/41.35 |
| 2006/0090715 | A1 * | 5/2006 | Kondo et al. | 123/48 B |
| 2008/0017164 | A1 * | 1/2008 | Hofbauer | 123/196 R |
| 2009/0145394 | A1 | 6/2009 | Nigro | 123/193.6 |
| 2011/0079200 | A1 * | 4/2011 | Lee | 123/48 B |
| 2011/0271932 | A1 | 11/2011 | Fuqua et al. | 123/301 |
| 2012/0073526 | A1 | 3/2012 | Dion et al. | 123/41.44 |

FOREIGN PATENT DOCUMENTS

| | | |
|---|---|---|
| CN | 2542841 Y | 4/2003 |
| CN | 102705101 A | 10/2012 |
| JP | 2005-127227 A | 5/2005 |
| JP | 2005-331056 A | 12/2005 |
| WO | WO 2012158756 | 5/2012 |
| WO | WO-2013/170593 A1 | 11/2013 |

OTHER PUBLICATIONS

International Search Report and Written Opinion for PCT application No. PCT/US2014/060414, mailed Jan. 28, 2015.

* cited by examiner

*Primary Examiner* — Marguerite McMahon
(74) *Attorney, Agent, or Firm* — Terrance A. Meador (57) ABSTRACT

A lubricating configuration in a two-stroke cycle, opposed-piston engine for a piston wristpin minimizes losses in oil pressure at the wristpin as the piston approaches bottom center and reduces the required oil supply pressure to the engine. The wristpin is constructed to absorb and store oil pressure energy when oil pressure at the wristpin is high, and to release that stored energy to pressurize the oil at the wristpin when connecting rod oil pressure is low.

20 Claims, 7 Drawing Sheets

LUBRICATING CONFIGURATION FOR MAINTAINING WRISTPIN OIL PRESSURE IN A TWO-STROKE CYCLE, OPPOSED-PISTON ENGINE

RELATED APPLICATIONS

This application contains subject matter related to the subject matter of U.S. patent application Ser. No. 13/136,955, filed Aug. 15, 2011 for "Piston Constructions for Opposed-Piston Engines," published as US 2012/0073526 on Mar. 29, 2012, and U.S. patent application Ser. No. 13/776,656, filed Feb. 25, 2013 for "Rocking Journal Bearings for Two-Stroke Cycle Engines".

BACKGROUND

The field is lubrication management for two-stroke cycle engines. More specifically the application relates to implementation of a wristpin oil pressure recovery device for pistons of a two-stroke cycle, opposed-piston engine.

Wristpins in reciprocating engines must be lubricated to mitigate the risk of highly loaded asperity contact in the joint. If asperity contact in the joint is sustained at high loads, excessive friction, wear and even catastrophic failure is possible. The applied load that causes this asperity contact is constantly changing as engine speed and load change.

In some aspects of two-stroke cycle opposed-piston engine operation, the nature of the cycle presents two distinct threats to wristpin durability: continuous compression loading and oil pressure variation.

Continuous compression loading results because load reversal on the wristpin bearings of a two-stroke engine may never occur during the normal speed and load range operation of the engine. During operation of a two-cycle engine, a combustion event occurs every cycle and there is nearly always a gas pressure loading the crown of a piston near top center (TC), which, even at high piston speeds, is still greater than the inertial force of the piston assembly on a wristpin bearing. At the other end of the cycle, at bottom center (BC), the inertial force of the piston assembly keeps the bearing loaded as well. As a result, the bearing is nearly always under positive load throughout the cycle, and it is difficult to replenish it with oil. Furthermore, given limited angular oscillation of the bearing, oil introduced between the bearing surfaces does not completely fill the bearing. Eventually the bearing begins to operate in a boundary layer lubrication mode which leads to excess friction, wear, and then bearing failure.

Solutions to the first problem include bearing constructions that cause separation of bearing parts in response to bearing rotation. One such solution is disclosed in related U.S. application Ser. No. 13/776,656: wristpins coupling the pistons of an opposed-piston engine are constructed with rocking journal bearings that provide biaxial rotation of bearing parts, which separates the parts to allow introduction of oil between the bearing surfaces. This bearing construction includes a reservoir in the rocking journal that acts as an accumulator to receive and maintain a volume of pressurized oil that is delivered to the bearing parts via outlet passages through the journal. An inlet passage in the journal for delivering oil to the accumulator is fed from a high-pressure oil passage in the associated connecting rod. Pressurized oil is transported to the oil passages of the connecting rods from a main oil gallery in an engine block. Here, the second problem becomes apparent.

As a pair of pistons move in opposition in a cylinder bore, the pressurized oil fed to their respective wristpins undergoes inertial loading that is most pronounced when the pistons change direction in the reversal zones at their top center (TC) and bottom center (BC) locations. Given the direction of motion from TC to BC during a power stroke, the inertial load can cause the oil pressure in the connecting rod oil passages to drop below a minimum level for effective wristpin lubrication as the pistons reverse direction at BC. Providing adequate oil pressure to lubricate the wristpins throughout the operating cycle of an opposed-piston engine, especially in the face of non-reversing loads, may require that the supply pressure to the main oil gallery increase with engine speed to overcome inertial forces on the oil column in the connecting rod. Typically, the main oil gallery is fed from a positive pressure pump, and it is possible to control the pump so as to vary the supply pressure with the speed of the engine. However, increasing engine-wide oil pressure solely for wristpin lubrication, as the speed of the engine increases, may result in oil pressure in excess of that required for the rest of the engine lubrication system. This will result in higher parasitic loads for the lubrication system and a higher friction-mean-effective-pressure (FMEP) for the engine.

Accordingly, there is a need for maintaining oil pressure in the oil reservoir of the wristpin of a two-stroke cycle, opposed-piston engine during engine operation. It is particularly desirable that the oil pressure be maintained at levels that guarantee effective lubrication throughout the operating cycle, at all engine speeds, without imposing excessive pumping losses on engine performance.

SUMMARY

In order to minimize losses in oil pressure at the wristpin as the piston approaches BC and reduce the required oil supply pressure, a wristpin is constructed to absorb and store oil pressure energy when oil pressure at the wristpin is high, and to release that stored energy to pressurize the oil at the wristpin when connecting rod oil pressure is low.

DETAILED DESCRIPTION

A two-stroke cycle engine is an internal combustion engine that completes a power cycle with a single complete rotation of a crankshaft and two strokes of a piston connected to the crankshaft. One example of a two-stroke cycle engine is an opposed-piston engine in which a pair of pistons is disposed in opposition in the bore of a cylinder.

Figure 1:
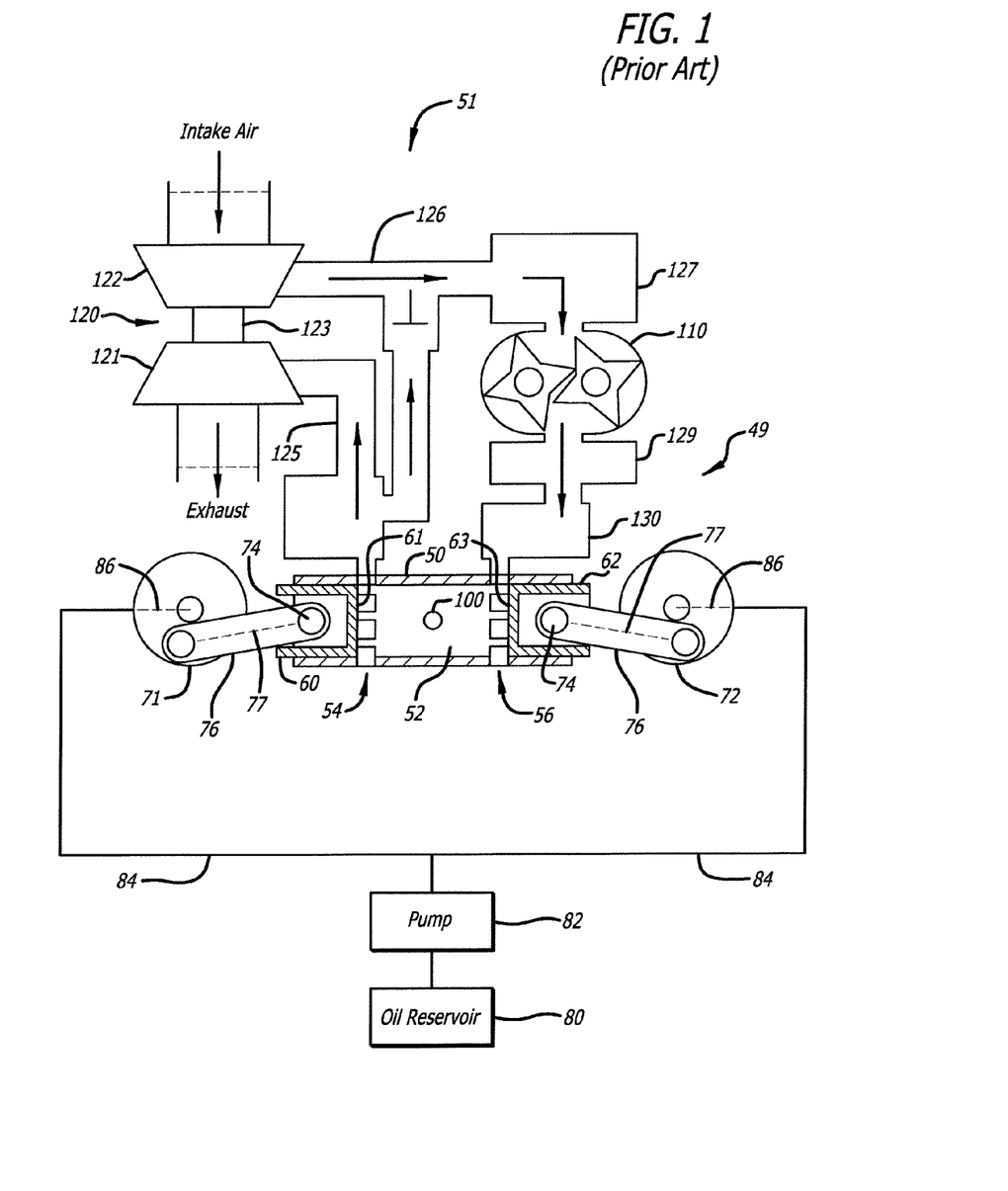
FIG. 1 schematic drawing of a prior art opposed-piston engine with a pump-supplied oil gallery, and is appropriately labeled "Prior Art"

As seen in FIG. 1, an opposed-piston engine 49 has at least one ported cylinder 50. For example, the engine may have one ported cylinder, two ported cylinders, three ported cylinders, or four or more ported cylinders. For purposes of illustration, the engine 49 is presumed to have a plurality of ported cylinders. Each cylinder 50 has a bore 52: exhaust and intake ports 54 and 56 are formed in respective ends thereof. The exhaust and intake ports 54 and 56 each include one or more circumferential arrays of openings. Exhaust and intake pistons 60 and 62 are slidably disposed in the bore 52 with their end surfaces 61 and 63 opposing one another. The exhaust pistons 60 are coupled to a crankshaft 71, and the intake pistons are coupled to a crankshaft 72. Each of the pistons is coupled to its associated crankshaft by a wrist pin 74 and a connecting rod 76. When the pistons 60 and 62 of a cylinder 50 are at or near respective TC locations, a combustion chamber is defined in the bore 52 between the end surfaces 61 and 63 of the pistons. Fuel is injected directly into the combustion chamber through at least one fuel injector nozzle 100 positioned in an opening through the cylinder's sidewall.

A lubrication system that supplies oil to lubricate the moving parts of the engine 49 includes an oil reservoir 80 from which pressurized oil is pumped by a pump 82 to a main gallery 84. The main gallery supplies pressurized oil to the crankshafts 71 and 72, typically through drillings to the main bearings (not seen). From grooves in the main bearings, pressurized oil is provided to grooves in the big end bearings of the connecting rods 76. From there, pressurized oil flows through drillings 77 in the connecting rods to the wristpins 74.

The engine 49 is equipped with an air management system 51 that includes a supercharger 110 and a turbocharger 120. The turbocharger has a turbine 121 and a compressor 122 rotating on a common shaft 123. The turbine 121 is coupled to the exhaust subsystem and the compressor 122 is coupled to the charge air subsystem. Exhaust gas emptied into the conduit 125 from the exhaust port 54 rotate the turbine 121. This rotates the compressor 122, causing it to generate charge air by compressing intake air. The charge air output by the compressor 122 flows through a conduit 126, whence it is pumped by the supercharger 110 to the openings of the intake port 56.

The operational cycle of an opposed-piston engine is well understood. In response to combustion occurring between their end surfaces 61, 63 the opposed pistons 60, 62 move away from their TC locations in the cylinder. While moving from TC, the pistons keep their associated ports closed until they approach respective BC positions. The pistons may move in phase so that the exhaust and intake ports 54, 56 open and close in unison; alternatively, one piston may lead the other in phase, in which case the intake and exhaust ports have different opening and closing times. As the pistons move through their BC locations exhaust products flowing out of the exhaust port 54 are replaced by charge air flowing into the cylinder through the intake port 56. After reaching BC, the pistons reverse direction and the ports are again closed by the pistons. While the pistons continue moving toward TC, the charge air in the cylinder 50 is compressed between the end surfaces 61 and 63. As the pistons advance to their respective TC locations in the cylinder bore, fuel is injected through the nozzles 100 into the charge air, and the mixture of charge air and fuel is compressed between the pistons 60 and 62. When the mixture reaches an ignition temperature, the fuel ignites. Combustion results, driving the pistons apart, toward their respective BC locations.

Figure 2:
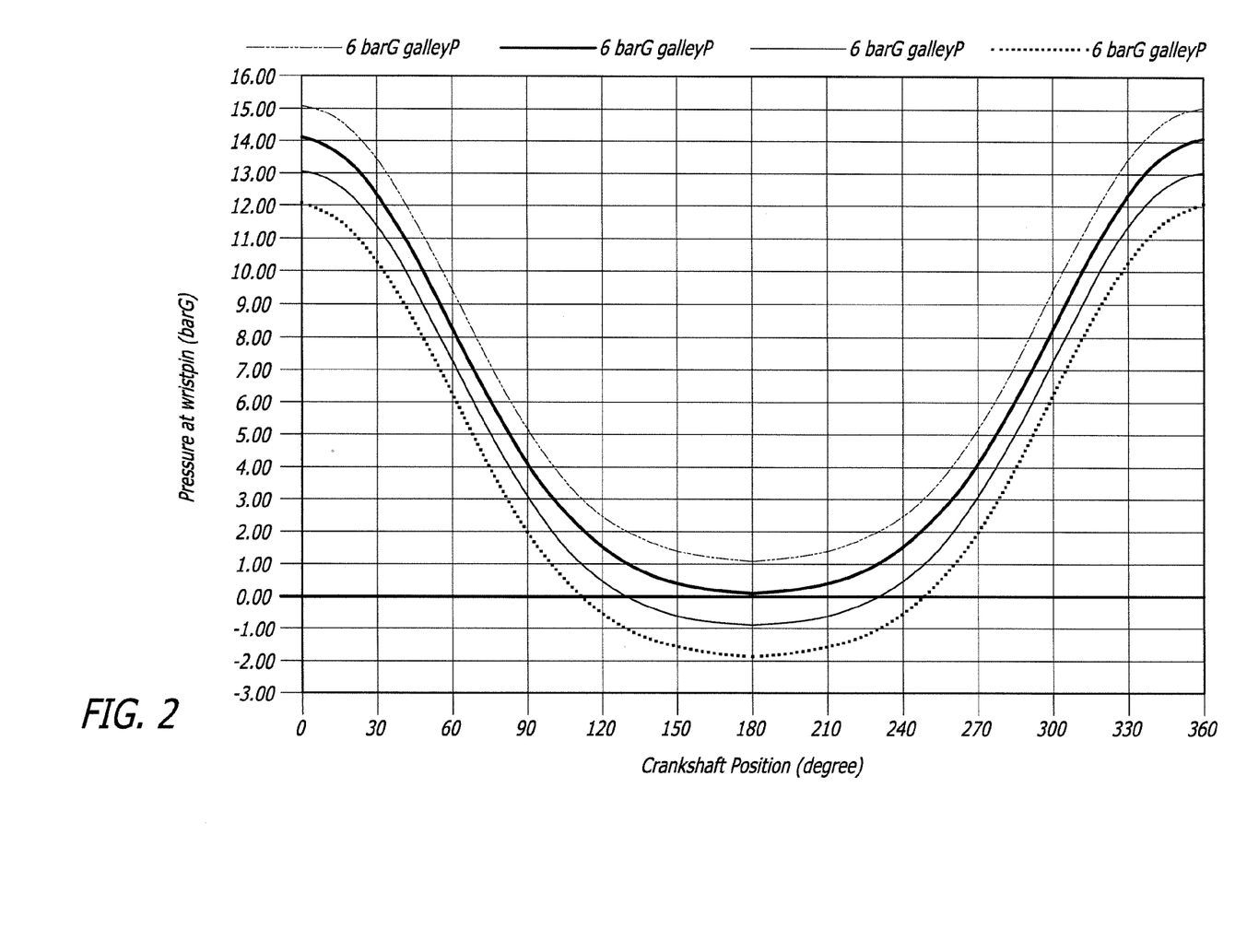
FIG. 2 is a graph showing wristpin oil supply pressures through one revolution from TC-to-BC-to-TC of a compression-ignition, two-stroke cycle, opposed-piston engine for various gallery oil pressures.

FIG. 2 is a graph that shows the oil pressures at the wristpins of a representative opposed-piton engine during a full cycle of the engine from a crank angle (CA) of 0° at TC to BC (180° CA) and back to TC (360° CA) for several main gallery oil pressures. As can be seen in FIG. 2, for a given gallery pressure, the oil pressure at the wristpins is at its highest at TC and at its lowest at BC. If main gallery pressure is below an engine-specific threshold, the pressure of the column of oil in the connecting rod drilling supplying the wristpin will go negative and the wristpin will not have pressurized oil available until such time in the cycle that the column pressure is positive again. As per FIG. 2, for a given engine geometry and crankshaft speed a main gallery pressure below five bar results in the oil pressure at the wristpin being negative at 180° CA (BC). At a main gallery oil pressure of five bar, the wristpin oil pressure is slightly positive and at six bar the wristpin oil pressure is at slightly above one bar which is the desired minimum pressure. A three bar main gallery oil pressure may be sufficient for all other lubrication systems in the engine, but a gallery oil pressure twice that amount is required to adequately lubricate the wristpin assembly during an entire engine cycle. With reference to FIG. 2, it is desirable that the lubrication system of an opposed-piston engine be configured to deliver lubricating oil in an amount sufficient to guarantee oil availability to the wristpins during the entire two-stroke engine cycle.

Figure 3:
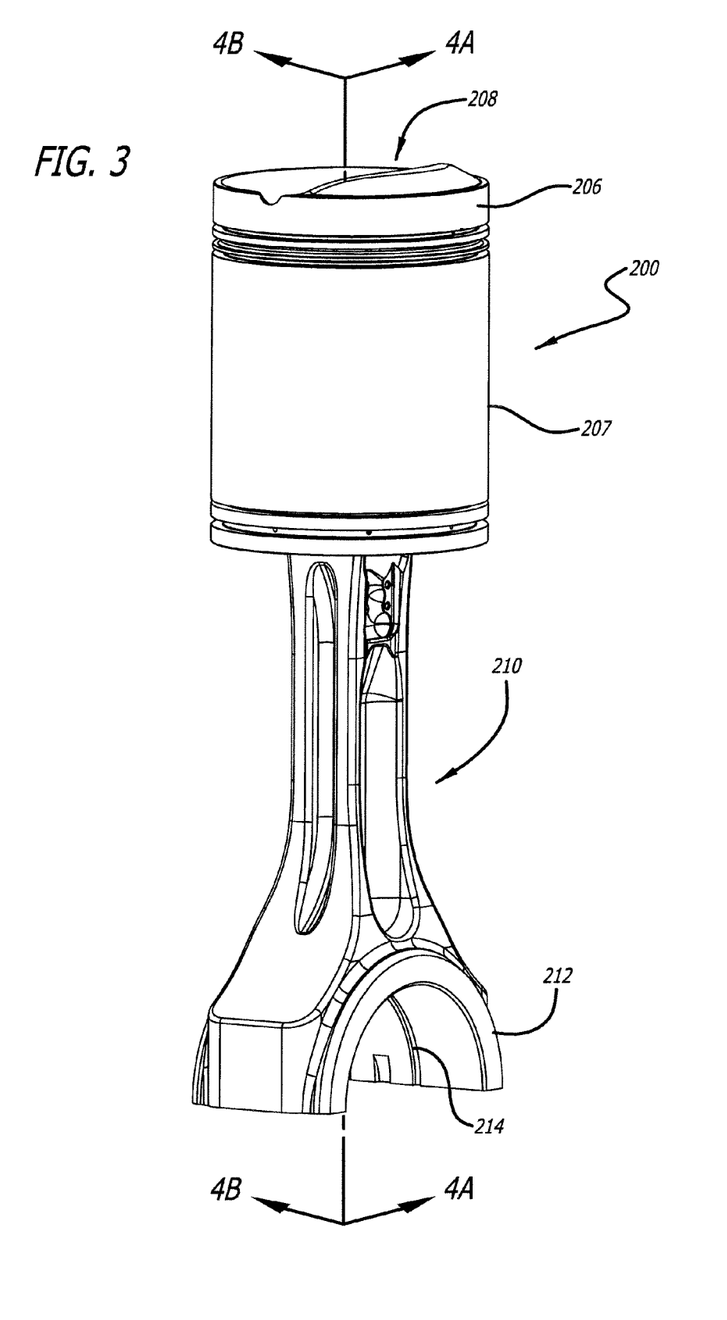
FIG. 3 is a side view, in perspective, of a piston/connecting rod assembly for a two-stroke cycle, opposed-piston engine according to the detailed description.

FIG. 3 is a perspective view of a piston assembly used in an opposed-piston engine that shows the piston 200 and its associated connecting rod 210. The piston 200 has a crown 206 attached to a skirt 207. An end surface 208 of the crown is configured to form a combustion chamber in cooperation with the end surface of an opposing piston, when both pistons are at or near TC. See, for example, the piston configurations described and illustrated in US publication 2011/0271932 and WO publication 2012/158756, and the piston configurations described and illustrated in U.S. application Ser. No. 13/843,686 and U.S. application Ser. No. 14/026,931. The connecting rod 210 has a large end 212 for coupling to a crank throw of a crankshaft (not seen). An oil groove 214 in the large end transports oil to a drilling in the shaft of the connecting rod. As per FIGS. 4A, 4B, and 5, the piston 200 further includes a bearing support structure 219 fixed to the lower surface of the crown 206 and disposed in the recess formed by the skirt 207. The bearing support structure 219 includes a generally cylindrical bearing surface 220 that receives a wristpin 221 (also called a "journal") mounted to the small end 215 of the connecting rod 210. The wristpin 221 includes an internal oil reservoir 222 in communication with one or more oil outlet passages 225 drilled through the wristpin 221 and operative to pass oil from the reservoir, through the wristpin and into an interface between the wristpin and the bearing surface. In some aspects, best seen in FIG. 4A, the oil reservoir 222 can be configured as a cylindrical recess with opposing ends and an axis that corresponds to the axis on which the wristpin 221 oscillates. Pressurized oil is transported from the groove 214 for delivery to the oil reservoir 222 through an oil delivery passage 216 in the connecting rod 210.

Lubricating Configuration for Maintaining Wristpin Oil Pressure

A lubricating configuration for maintaining wristpin oil pressure at a level sufficient to guarantee oil availability to the wristpins of an opposed-piston engine during the entire two-stroke engine cycle is illustrated by an embodiment shown in FIGS. 4A, 4B, 5, and 6. However, it should be understood that no aspect of the embodiment is meant to be specifically limiting.

In this example, a lubrication configuration includes at least one oil pressure absorber 250 disposed in the oil reservoir 222, a wristpin oil inlet passage 223 in communication with the oil reservoir 222, the oil delivery passage 216 in the connecting rod 210, and a pressure-responsive control device 260. The pressure-responsive control device 260 can be configured to couple the oil delivery passage 216 with the wristpin oil inlet passage 223 for transport of oil into the reservoir 222 while oil pressure in the oil delivery passage 216 slightly exceeds the oil pressure in the oil reservoir 222, and to decouple the oil delivery passage 216 from the wristpin oil inlet passage 223 so as to block the transport of oil from the reservoir 222 to the oil delivery passage when oil pressure in the oil delivery passage 216 decreases with respect to the oil pressure in the oil reservoir 222. Thus, while the piston 200 moves from BC to TC and inertial forces cause the oil pressure in the oil delivery passage 216 to rise and peak, the oil delivery passage 216 is coupled with the wristpin oil inlet passage 223 and the energy in the incoming surge in oil pressure is absorbed by the oil pressure absorber 250. In response to the surge, the oil pressure absorber 250 absorbs energy in such a manner as to create additional space in the oil reservoir 222 for more pressurized oil. While the piston 200 returns from TC to BC, the inertial forces on the oil column in the oil delivery passageway 216 reverse, whereby the oil pressure in the oil delivery passageway 216 drops. When the oil pressure in the oil delivery passage 216 begins to fall with respect to the oil pressure in the reservoir, the oil delivery passage 216 is decoupled from the wristpin oil inlet passage 223 so as to block transport of oil from the reservoir to the oil delivery passage 216. The energy stored in the oil pressure absorber 250 is released, causing the absorber to act on the oil stored in the oil reservoir 222 by reducing the additional space, which maintains oil pressure in the reservoir at a level sufficient to continue separating and lubricating the wristpin/bearing surface interface until the piston 200 reverses direction and the oil delivery passage 216 is again coupled with the wristpin oil inlet passage.

In a preferred embodiment, the oil pressure absorber 250 is constructed to absorb energy by compressing, and to release stored energy by expanding. In some aspects, seen in FIGS. 4A, 5, and 6, an oil pressure absorber 250 is configured as a piston 251 with a closed end 253 and a spring 256 disposed in the axial space of the piston 251. The cylindrical recess forming the reservoir 222 includes a ledge 272 with an annular surface 273 opposing an end 274 of the wristpin 221 that is closed by a press-fit plug 276. The annular surface 273 lies in a plane perpendicular to the axis 270, which is shared by the wristpin and the cylindrical recess. The piston 251 is disposed between the annular surface 273 and the end 274 for being moved therebetween, along the axis 270, in response to a change in oil pressure in the reservoir 222. Movement of the piston 251 is controlled by the spring 256, which acts between the closed end 253 and the plug 276. When the parts 221, 251, 256, and 276 are assembled, the spring 256 is compressed enough to urge the piston toward, if not against, the annular surface 273. As oil pressure in the reservoir increases and exceeds the pressure of the spring 256, the piston 251 is urged by the oil pressure away from the surface 273, toward the plug 276, further compressing the spring 256; as the oil pressure drops, the spring compressed 256 pushes the piston 251 once again back toward the surface 273.

Figures 4A, 4B:
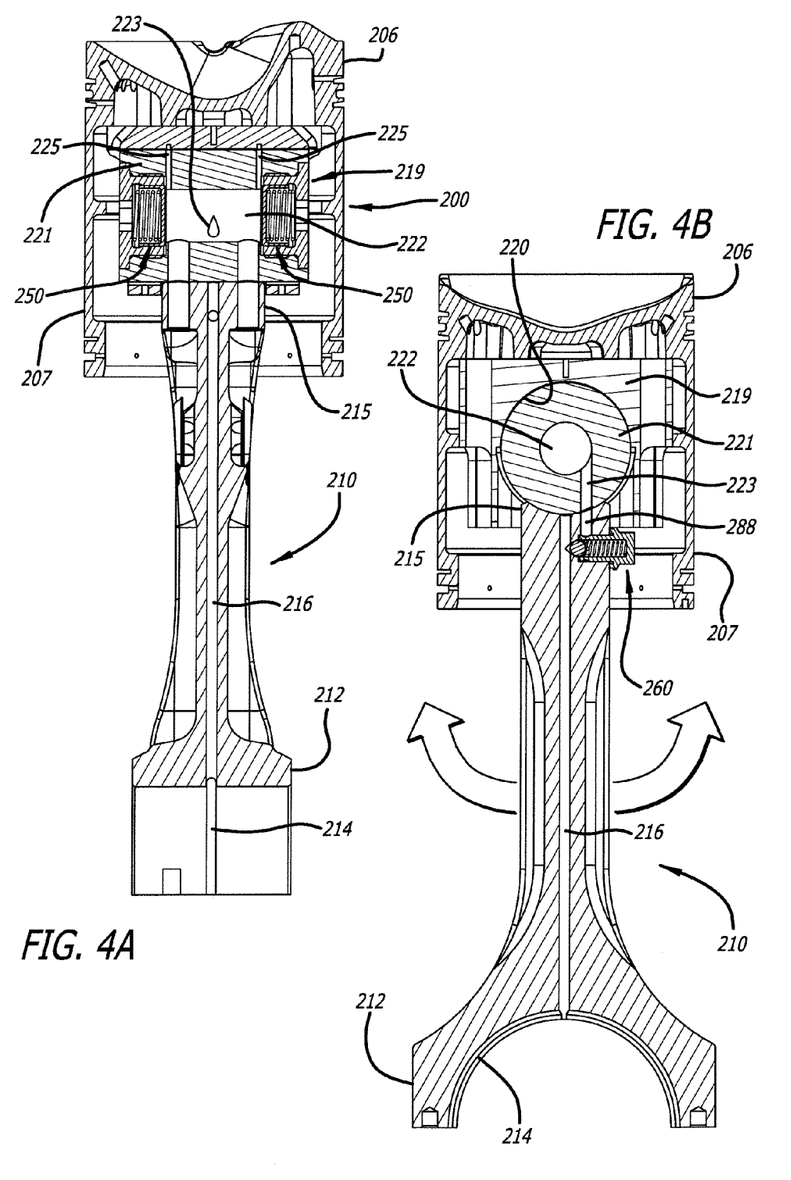
FIG. 4A is an axial sectional view taken along line A-A of the piston and connecting rod of FIG. 3 showing a wristpin lubricating configuration.
FIG. 4B is a sectional view taken along line B-B of FIG. 3.
Figure 5:
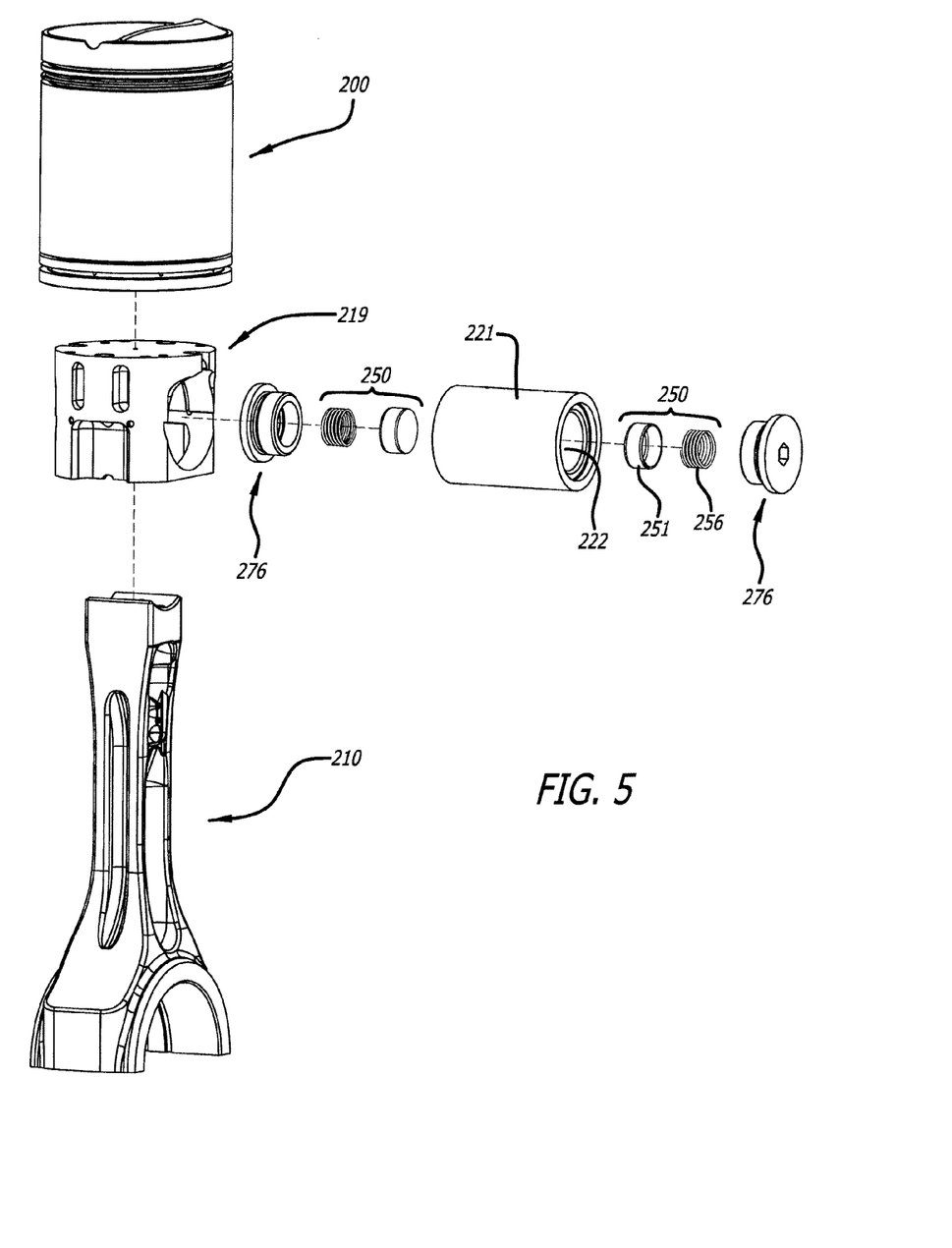
FIG. 5 is an exploded view of the piston and connecting rod showing elements of the wristpin lubricating configuration.
Figure 6:
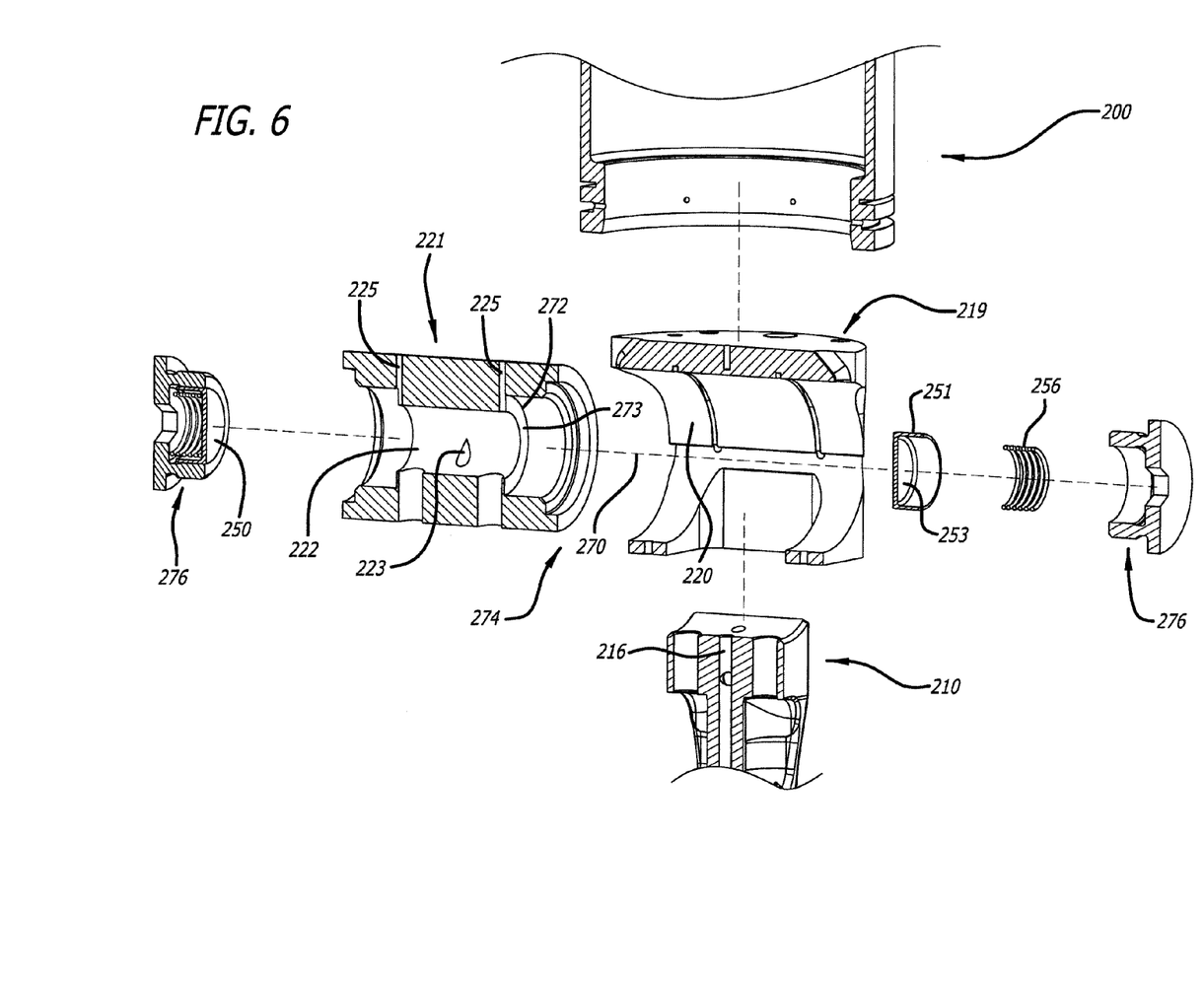
FIG. 6 is an enlarged sectional view, in perspective, showing the wristpin partially disassembled.

Two oil pressure absorbers are shown in FIGS. 4A, 5, and 6, one at each end of the wristpin 221. However, it should be understood that this number is not meant to be specifically limiting; instead, one absorber 250 can be provided at either end of the wristpin. Further, the oil pressure absorber is configured as a piston/spring combination. However, it should be understood that this configuration is not meant to be specifically limiting. Instead, the absorber can be configured as a bladder, a bellows, or another equivalent structure capable of absorbing, storing, and releasing energy in response to changes in oil pressure.

Figure 7:
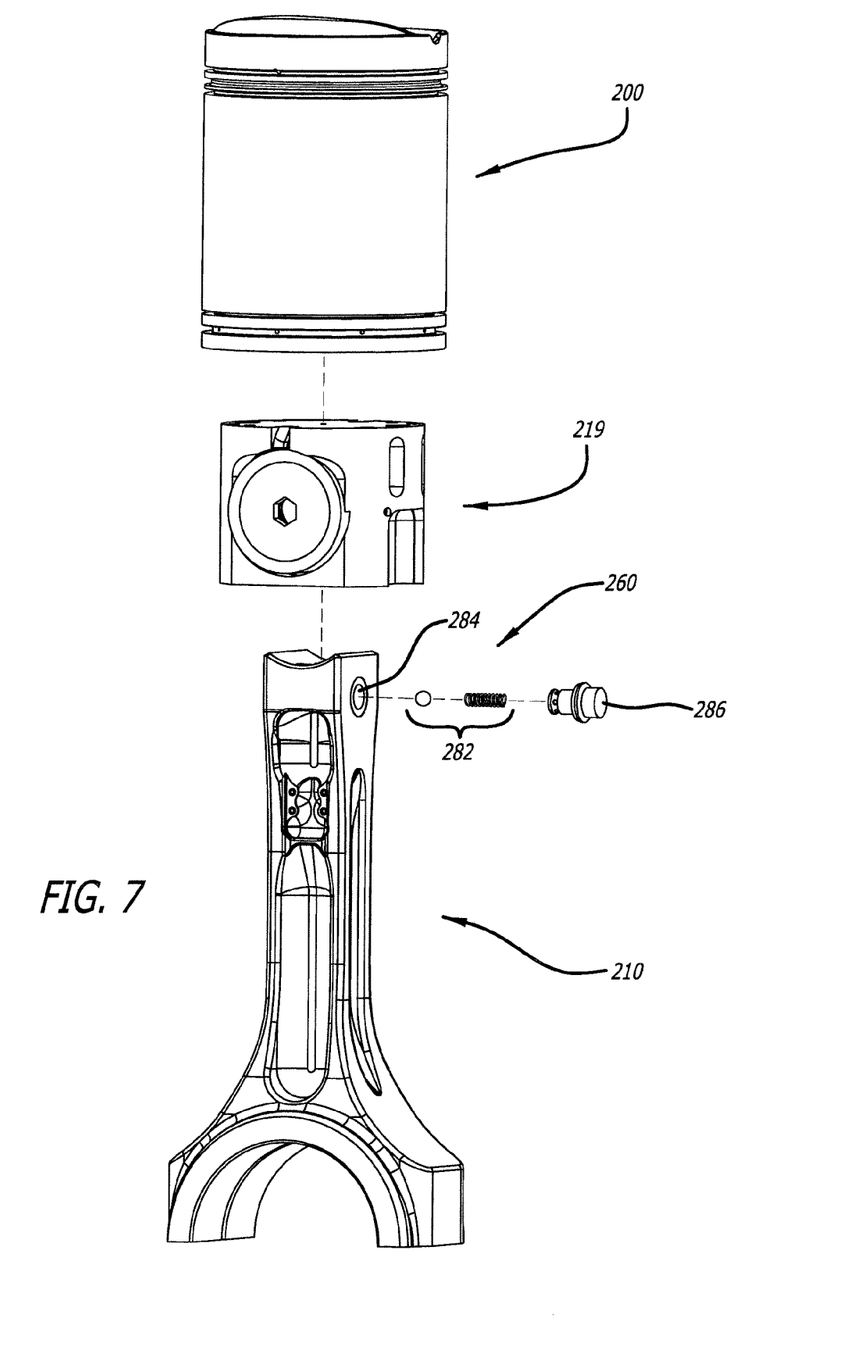
FIG. 7 is an exploded view of the piston and connecting rod showing elements of a pressure-responsive control device configured to couple an oil delivery passage in the connecting rod with an oil inlet passage in the wristpin

With reference to FIGS. 4B and 7, the pressure-responsive control device 260 can be configured to couple the oil delivery passage 216 with the wristpin oil inlet passage 223 in response to a difference in oil pressures in the passages. For example, the device can be configured as a check valve 282 seated in a recess 284 in the connecting rod 210 by a threaded or press-fit plug 286 which may be separate from or integral with the check valve. The check valve 282 is positioned between the oil delivery passage 216 and an auxiliary oil passage 288 formed in the connecting rod 210 in alignment with the oil inlet passage 223. The check valve 282 is a passive valve that reacts to the pressure of the oil in the oil delivery passage 216. When the oil pressure in the passage 216 is high, as when the piston 200 approaches TC, the valve ball depresses the spring, which opens the check valve 282 to allow pressurized oil into the wristpin oil reservoir 222. As the piston 200 reverses and accelerates during the combustion cycle, oil in the wristpin reservoir 222 will start migrating down the oil delivery passage 216 which results in a pressure differential across the check valve 282. This pressure differential causes the check valve 282 to close thereby closing the auxiliary oil passage 288. Therefore, the pressurized oil in the reservoir 222 stays at its high pressure level for lubricating the wristpin interfaces.

The pressure-responsive control device 260 is configured as a ball check valve. However, it should be understood that this configuration is not meant to be specifically limiting. Instead, the pressure-responsive control device 260 can be configured as a diaphragm valve, a swing or tilting disc valve, a lift or an in-line valve, a reed valve, or another one-way device that that normally allows oil or lubricant to flow through it in only one direction.

During any engine cycle at TC there is an abundance of galley oil pressure available at the wristpin assembly. By capturing this high oil pressure at the wristpin when it is available and storing it until it is needed during the engine cycle when the available galley oil pressure is at a minimum, a more constant oil pressure can be maintained for the wristpin during an entire engine cycle.

The lubricating configuration embodiments that are described herein, and the devices and procedures with which they are implemented, are illustrative and are not intended to be limiting.

The invention claimed is:

1. A lubricating configuration in a two-stroke cycle engine in which a piston includes a bearing support structure with a bearing surface, and a wristpin fixed to the small end of a connecting rod, and the bearing support structure retains the wristpin for oscillation in the bearing surface, the lubricating configuration comprising:

an internal oil reservoir in the wristpin in communication with one or more wristpin oil outlet passages operative to pass oil through the wristpin into an interface between the wristpin and the bearing surface;

at least one oil pressure absorber disposed in the oil reservoir;

a wristpin oil inlet passage in communication with the oil reservoir;

an oil delivery passage in the connecting rod; and, a pressure-responsive control device coupling the oil delivery passage with the wristpin oil inlet passage;

in which the pressure-responsive control device is oriented so as to open for passage of oil into the reservoir when oil pressure in the oil delivery passage exceeds the oil pressure in the oil reservoir and to close otherwise.

2. The lubricating configuration of claim 1, in which the bearing is one of a rocking wristpin bearing, a ladder bearing, a pressed pin bearing, and a full floating wrist pin bearing.

3. The lubricating configuration of claim 1, in which the reservoir is a generally cylindrical recess in the wristpin, closed at opposite ends, and the oil pressure absorber is seated proximate one end of the cylindrical recess.

4. The lubricating configuration of claim 3, in which the cylindrical recess has an axis and a ledge with an annular surface opposing the one end in a plane perpendicular to the axis, and the oil pressure absorber includes:
   a piston disposed between the annular surface and the one end for being moved therebetween, along the axis, in response to a change in oil pressure in the reservoir; and
   a spring compressed between the piston and the one end that urges the piston toward the annular surface.

5. The lubricating configuration of claim 4, in which the pressure-responsive control device is a check valve mounted to the connecting rod, near the small end.

6. The lubricating configuration of claim 1, in which the reservoir is a generally cylindrical recess in the wristpin, closed at opposite ends, a first oil pressure absorber is seated proximate a first end of the cylindrical recess, and a second oil pressure absorber is seated proximate a second end of the cylindrical recess.

7. The lubricating configuration of claim 6, in which the cylindrical recess has an axis, a first ledge with an annular surface opposing the first end in a plane perpendicular to the axis, a second ledge with an annular surface opposing the second end in a plane perpendicular to the axis, and each oil pressure absorber includes:
   a piston disposed between a respective annular surface a respective end for being moved therebetween, along the axis, in response to a change in oil pressure in the reservoir; and
   a spring compressed between the piston and the respective end that urges the piston toward the respective annular surface.

8. The lubricating configuration of claim 7, in which the pressure-responsive control device is a check valve mounted to the connecting rod, near the small end.

9. The lubricating configuration of claim 1, in which the pressure-responsive control device is one of a check valve, a diaphragm valve, a swing or tilting disc valve, a lift or an in-line valve, and a reed valve.

10. An opposed-piston engine comprising at least one cylinder with longitudinally-separated exhaust and intake ports, a pair of pistons disposed in opposition to one another in a bore of the cylinder, and a pair of connecting rods, each piston being connected to a small end of a respective connecting rod by a wristpin, in which a lubricating configuration for each wristpin comprises:
   an internal oil reservoir in the wristpin that communicates with one or more wristpin oil outlet passages operative to pass oil through the wristpin into an interface between the wristpin and a bearing surface;
   an oil pressure absorber disposed in the oil reservoir;
   a wristpin oil inlet passage in communication with the oil reservoir;
   an oil delivery passage in the connecting rod; and,
   a pressure-responsive control device coupling the oil delivery passage with the wristpin oil inlet passage;
   in which the pressure-responsive control device is oriented so as to open for passage of oil into the reservoir when oil pressure in the oil delivery passage exceeds the oil pressure in the oil reservoir and to close otherwise.

11. The opposed-piston engine of claim 10, in which the bearing is one of a rocking wristpin bearing, a ladder bearing, a pressed pin bearing, and a full floating wrist pin bearing.

12. The opposed-piston engine of claim 10, in which the reservoir is a generally cylindrical recess in the wristpin, closed at opposite ends, and the oil pressure absorber is seated proximate one end of the cylindrical recess.

13. The opposed-piston engine of claim 12, in which the cylindrical recess has an axis and a ledge with an annular surface opposing the one end in a plane perpendicular to the axis, and the oil pressure absorber includes:
   a piston disposed between the annular surface and the one end for being moved therebetween, along the axis, in response to a change in oil pressure in the reservoir; and
   a spring compressed between the piston and the one end that urges the piston toward the annular surface.

14. The opposed-piston engine of claim 13, in which the pressure-responsive control device is a check valve mounted to the connecting rod, near the small end.

15. The opposed-piston engine of claim 10, in which the reservoir is a generally cylindrical recess in the wristpin, closed at opposite ends, a first oil pressure absorber is seated proximate a first end of the cylindrical recess, and a second oil pressure absorber is seated proximate a second end of the cylindrical recess.

16. The opposed-piston engine of claim 15, in which the cylindrical recess has an axis, a first ledge with an annular surface opposing the first end in a plane perpendicular to the axis, a second ledge with an annular surface opposing the second end in a plane perpendicular to the axis, and each oil pressure absorber includes:
   a piston disposed between a respective annular surface a respective end for being moved therebetween, along the axis, in response to a change in oil pressure in the reservoir; and
   a spring compressed between the piston and the respective end that urges the piston toward the respective annular surface.

17. The opposed-piston engine of claim 16, in which the pressure-responsive control device is a check valve mounted to the connecting rod, near the small end.

18. The opposed-piston engine of claim 10, in which the pressure-responsive control device is one of a check valve, a diaphragm valve, a swing or tilting disc valve, a lift or an in-line valve, and a reed valve.

19. A method for lubricating a wristpin bearing of an opposed-piston engine;
   in which the wristpin bearing couples a piston to a connecting rod:
      transporting oil through an oil passageway in the connecting rod to an internal oil reservoir in the wristpin while the oil pressure in the connecting rod exceeds the oil pressure in the internal oil reservoir;
      accumulating energy in an oil pressure absorber disposed in the oil reservoir while oil is transported into the internal oil reservoir;
      conducting oil from the internal oil reservoir through one or more wristpin oil outlet passages into an interface between the wristpin and a bearing surface in response to transport of oil into the internal oil reservoir;
      preventing the transport of oil from the internal oil reservoir to the oil passageway while the oil pressure in the connecting rod is equal to or less than the oil pressure in the internal oil reservoir releasing energy from the oil pressure absorber disposed in the oil reservoir while oil is prevented from being transported to the oil passage; and, conducting oil from the internal oil reservoir through the one or more wristpin oil outlet passages into the interface between the wristpin and the bearing surface in response to release of energy from the oil pressure absorber.

20. A method for lubricating a wristpin bearing of an opposed-piston engine;

in which the wristpin bearing couples a piston to a connecting rod:

transporting oil through an oil passageway in the connecting rod to an internal oil reservoir in the wristpin during movement of the piston from a bottom center (BC) location to a top center (TC) location;

accumulating energy in an oil pressure absorber disposed in the oil reservoir while oil is transported into the internal oil reservoir;

conducting oil from the internal oil reservoir through one or more wristpin oil outlet passages into an interface between the wristpin and a bearing surface in response to transport of oil into the internal oil reservoir;

preventing the transport of oil from the internal oil reservoir to the oil passageway during movement of the piston from the TC location to the BC location releasing energy from the oil pressure absorber disposed in the oil reservoir while oil is prevented from being transported to the oil passage; and, conducting oil from the internal oil reservoir through the one or more wristpin oil outlet passages into the interface between the wristpin and the bearing surface in response to release of energy from the oil pressure absorber.

* * * * *